United States Patent Office 3,060,230
Patented Oct. 23, 1962

3,060,230
A-NOR-STEROID DERIVATIVES AND PROCESS
OF PREPARING SAME
Tokuo Kubota, Hyogo Prefecture, Japan, assignor to
Shionogi & Co., Ltd., Osaka, Japan
No Drawing. Filed Mar. 28, 1962, Ser. No. 183,360
8 Claims. (Cl. 260—488)

The present invention relates to steroid compounds and is more particularly concerned with 1,2-dioxo-A-nor-steroids and the production thereof.

The present application is a continuation-in-part of co-pending application Serial No. 93,370, filed March 6, 1961 and now abandoned.

It is an obejct of the present invention to provide a process for preparing 1,2-dioxo-A-nor-steroids. It is another object of the present invention to provide 1,2-dioxo-A-nor-steroids having pharmacological activities. Other objects of this invention will be apparent to those skilled in the art to which this invention pertains.

The process of the present invention may be represented by the following partial formula showing only the A-ring of the steroid skeleton:

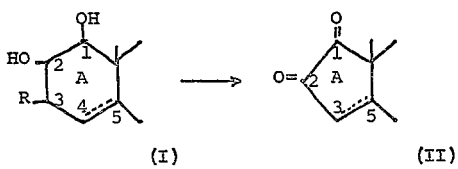

(I)                    (II)

wherein R represents a hydroxyl or an oxo group and, when R is a hydroxyl group, the double bond shown by dotted line is indispensable. Otherwise stated, the following embodiments are included:

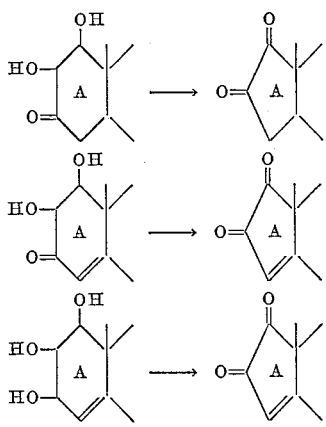

The process of the present invention is generally applicable to all hydroxy-steroids having the partial structure of Formula I. Thus, the starting material of the present invention may be 1,2,3-trihydroxy-$\Delta^4$-steroids, 1,2-dihydroxy-3-oxo-$\Delta^4$-steroids or 1,2-dihydroxy-3-oxo-steroids of the androstane, pregnane, cholestane or spirostane series. The steric configuration of the hydroxyl groups on the A-ring of the starting material has substantially no effect on the reaction; that is, the hydroxyl groups may each have $\alpha$-configuration or $\beta$-configuration. Furthermore, any substituents present on other rings do not exert any substantial effect on the reaction and such groups as 11-hydroxyl, 17-hydroxyl or 17-side chain are not affected essentially by the reaction. Accordingly, such groups may exist at any position on the B-, C- or D-ring of the starting material. Examples of hydroxy-steroids available as starting compounds include 4-androstene-1,2-diol-3,17-dione; 5$\alpha$ - androstane - 1,2,17$\beta$ - triol - 3 - one 17 - propionate; 4 - androstene - 1,2,17$\beta$ - triol - 3 - one 17 - propionate; 4 - androstene - 1,2,3,17$\beta$ - tetraol 17 - propionate; 5$\beta$ - pregnane - 1,2,11$\beta$,17$\alpha$,21 - pentaol - 3 - one 21 - acetate; 4 - pregnene - 1,2,11$\beta$,17$\alpha$,21-pentaol - 3 - one 21-acetate; 4 - pregnene - 1,2,3,11$\beta$,17$\alpha$21 - hexaol 21 - acetate; 5$\alpha$ - pregnane - 1,2 - diol - 3,20 - dione; 4 - pregnene-1,2 - diol - 3,20 - dione; 4 - pregnene - 1,2,3 - triol - 20-one; 5$\alpha$ - pregnane - 1,2,21 - triol - 3,20 - dione 21 - acetate; 4 - pregnene - 1,2,21 - triol - 3,20 - dione 21 - actate; 4-pregnene - 1,2,3,21 - tetraol - 20 - one 21 - acetate; cholestane - 1,2 - diol - 3 - one; 4 - cholestene - 1,2 - diol - 3-one; 4 - cholestene - 1,2,3-triol; methyl 1,2-dihydroxy-3-oxo-4-cholenate; 25D-spirostane-1,2-diol-3-one; 25D-4-spirostene - 1,2 - diol - 3 - one; 25D - 4 - spirostene - 1,2,3-triol; etc. (In the preceding exemplary compounds, the hydroxyl groups at the 1-, 2- and/or 3-position may each have $\alpha$- or $\beta$-configuration.) These hydroxy-steroids may be prepared in per se conventional manner; e.g. by the oxidation of the corresponding $\Delta^1$-steroids comprising treating the $\Delta^1$-steroids with osmium tetroxide and pyridine at a temperature between 10 and 40° C. and treating the resultant intermediates with hydrogen sulfide while ice-cooling.

The process of the present invention comprises oxidizing the hydroxy-steroid having the partial structure of Formula I with manganese dioxide. The reaction may be carried out in an inert organic solvent at a lower temperature (preferably a temperature between 10 and 40° C.). The reaction is generally accomplished within about 6 hours, but strict control of reaction time is not necessary. As the reaction solvent, there may be mentioned, by way of example, benzene, chloroform, carbon tetrachloride, dioxane, acetone, t-butanol, etc. The employed manganese dioxide may be prepared in per se conventional manner, e.g. Rosenkranz's method (Mancera et al.: J. Chem. Soc., page 2189 (1953)).

The thus-produced A-nor-steroid derivatives show medicinal activities as antagonists to hormonic substances, and are valuable therapeutic compounds.

For example, a representative compound prepared by the process of the present invention, A-nor-3(5)-androstene-17$\beta$-ol-1,2-dione 17-propionate, shows complete inhibition of gonadotropin hypersecretion without significant androgenic activity in the castrated male rat which received a total of 10 milligrams. Accordingly, the compound is useful as (1) controlling agent for diseases of menopause; (2) ovulation-inhibition agent or contraceptive agent; and (3) controlling agent for hypergonadism or precocious puberty. Animal test data, e.g. with the rat, establish that the other compounds of the present invention also show specific activities. For instance, A-nor-3(5)-pregnene-21-ol-1,2,20-trione 21-acetate produces DOCA (desoxycorticosterone acetate) like action at a dosage of 5 milligrams and enhances the DOCA action when used simultaneously with DOCA. Furthermore, A-nor-3(5) - pregnene - 11$\beta$,17$\alpha$,21-triol-1,2,20-trione 21 acetate has a Na-excreting action. Thus, the products of the present invention have specific pharmacological activities.

The following examples illustrate methods of carrying out the present invention, but it is to be understood that these examples are given for purposes of illustration and not of limitation. In the following examples, mg.=milligrams, g.=grams, and ml.=milliliters.

EXAMPLE 1

*Preparation of A-Nor-25D-3(5)-Spirostene-1,2-Dione*

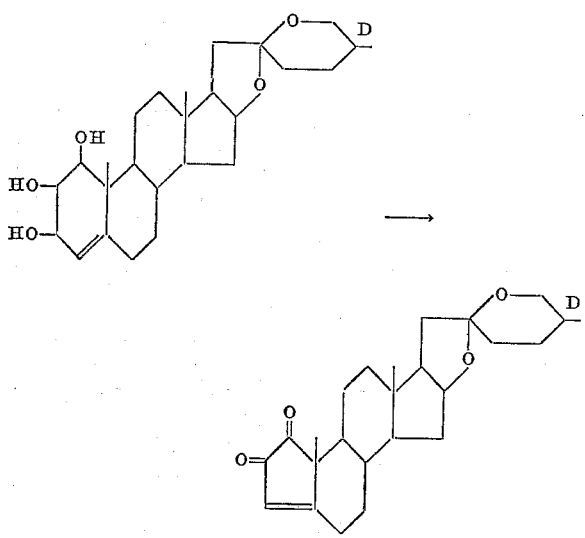

To a solution of 25D-4-spirostene-1β,2β,3α-triol (300 mg.) in chloroform (30 ml.), there is added manganese dioxide (3 g.), and the resultant mixture is stirred for 6 hours at room temperature (around 15° C.). The manganese dioxide is filtered off and the filtrate is evaporated to dryness and chromatographed over silica gel (3.0 g.). Elution with benzene and recrystallization of the eluate (188 mg.) from a mixture of chloroform and methanol gives A-nor-25D-3(5)-spirostene-1,2-dione (140 mg.) as yellow plates melting at 228 to 230° C. (decomp.). Negative in ferric chloride reaction. $[\alpha]_D$ —118° (c., 0.75 in chloroform.

U.V.: $\lambda_{max.}^{ethanol}$ 230, 282 mμ (log ε:3.60, 3.75); $\lambda_{max.}^{KOH}$ 345 mμ (log ε:3.70). I.R.: $\lambda_{max.}^{Nujol}$ 5.69, 5.80, 6.22μ

*Analysis.*—Calcd. for $C_{26}H_{36}O_4$: C, 75.69; H, 8.80. Found: C, 75.71; H, 8.81.

The starting compound in this example, 25D-4-spirostene-1β,2β,3α-triol, is prepared by refluxing 25D-spirostane-1β,2β,3α,5β-tetraol (kogagenin) with acetic anhydride and pyridine for 3 hours, allowing the resultant triacetate to stand with thionyl chloride in pyridine for 45 minutes while ice-cooling and refluxing the resulting Δ⁴-steroid with methanolic potassium hydroxide for 1 hour.

EXAMPLE 2

*Preparation of A-Nor-25D-3(5)-Spirostene-1,2-Dione*

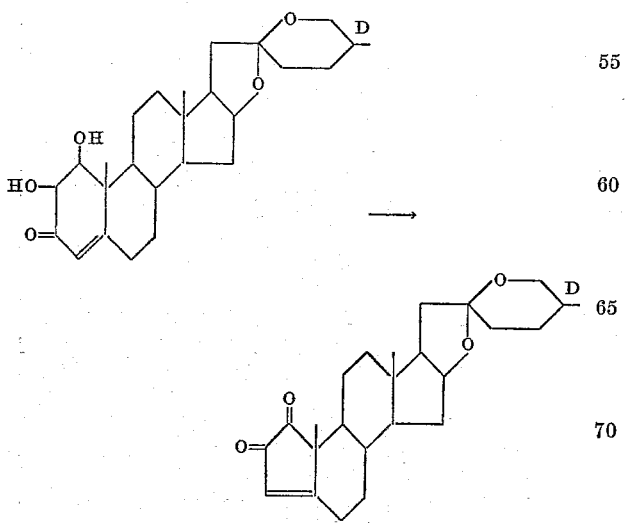

To a solution of 25D-4-spirostene-1β,2β-diol-3-one (500 mg.) in chloroform (50 ml.), there is added manganese dioxide (5 g.), and the resultant mixture is stirred for 6 hours at room temperature (around 15° C.). The manganese dioxide is filtered off and the filtrate is evaporated to dryness and chromatographed over silica gel (5 g.). Elution with benzene and recrystallization of the eluate (333 mg.) from a mixture of chloroform and methanol gives A-nor-25D-3(5)-spirostene-1,2-dione (290 mg.) as yellow plates melting at 228 to 230° C. (decomp.).

The starting compound in this example, 25D-4-spirostene-1β,2β-diol-3-one, is prepared by shaking 25D-4-spirostene-1β,2β,3α-triol with manganese dioxide in chloroform for 45 minutes under cooling in an ice-bath, removing the manganese dioxide and the solvent from the reaction mixture, chromatographing the residue on silica gel using benzene-chloroform (9:1 to 4:1) and then chloroform as the eluting solvent and crystallizing the chloroform eluate from aqueous acetone.

EXAMPLE 3

*Preparation of A-Nor-3(5)-Chloestene-1,2-Dione*

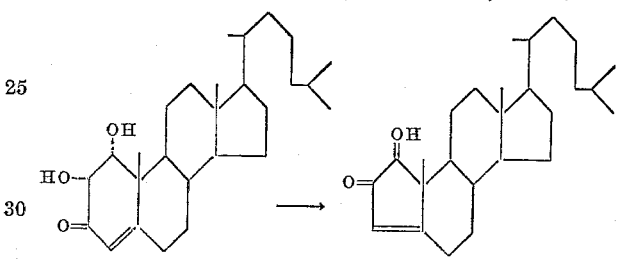

To a solution of 4-chloestene-1α,2α-diol-3-one (243 mg.) in chloroform (24 ml.), there is added manganese dioxide (2.4 g.), and the resultant mixture is stirred for 6 hours at room temperature (around 20° C.). The manganese dioxide is filtered off and the filtrate is evaporated to dryness and chromatographed over silica gel (2 g.). Elution with petroleum ether-benzene (1:1) and recrystallization of the eluate (48 mg.) from a mixture of acetone and petroleum ether gives A-nor-3(5)-chloestene-1,2-dione (32 mg.) as yellow plates melting at 118 to 119° C. (decomp.).

U.V.: $\lambda_{max.}^{ethanol}$ 284 mμ (ε:5,600)

I.R.: $\lambda_{max.}^{Nujol}$ 5.69, 5.80, 5.82, 6.24μ

*Analysis.*—Calcd. for $C_{26}H_{40}O_2$: C, 81.20, H, 10.48. Found: C, 80.75; H, 10.58.

The starting compound in this example, 4-chlorestene-1α,2α-diol-3-one, is prepared by allowing 1,4-chloestadiene-3-one to stand with osmium tetroxide and pyridine at room temperature for 8 days, adding petroleum ether to the reaction mixture whereby crystals are precipitated, inspiring hydrogen sulfide into the solution of the collected crystals in dioxane while ice-cooling, condensing the filtrate separated from the resultant mixture, chromatographing the residue on silica gel using benzene and/or chloroform as the eluating solvent and crystallizing the eluate from methanol.

EXAMPLE 4

*Preperation of A-Nor-3(5)-Pregnene-11β,17α,21-Triol-1,2,20-Trione 21-Acetate*

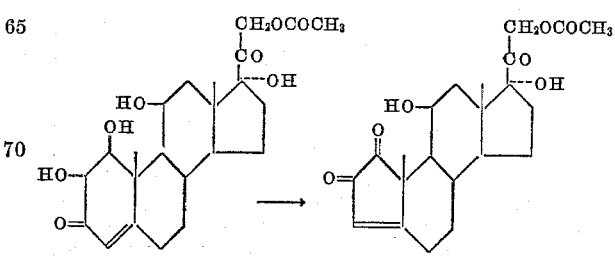

To a solution of 4-pregnene-1α,2α,11β,17α,21-pentaol- 3-one 21-acetate (150 mg.) in chloroform (15 ml.) and dioxane (5 ml.), there is added manganese dioxide (1.5 g.), and the resultant mixture is stirred for 6 hours at 30° C. The manganese dioxide is filtered off and the filtrate is evaporated to dryness. The yellow residue (82 mg.) is crystalizzed with acetone and recrystallized from a mixture of acetone and hexane to yield A-nor-3(5)-pregnene-11β,17α-21-triol-1,2,20-trione 21-acetate as yellow prisms melting at 199 to 201° C.

U.V.:$\lambda_{max.}^{ethanol}$ 282 mμ (ε:5,600). I.R.:$\lambda_{max.}^{Nujol}$ 2.77, 2.80, 2.89, 2.98, 5.69, 5.75, 5.80, 6.06, 6.28μ.

Analysis.—Calcd. for $C_{22}H_{28}O_7 \cdot H_2O$: C, 62.54; H, 7.16. Found: C, 62.64; H, 7.19.

The starting compound in this example, 4-pregnene-1α,2α,11β, 17α,21-pentaol-3-one 21-acetate, is prepared from 1,4-pregnadiene-11β,17α,21-triol-3-one 21-acetate (prednisolone acetate) as in Example 3, but employing chloroform-methanol (99:1 to 49:1) as the eluating solvent.

EXAMPLE 5

*Preparation of A-Nor-3(5)-Androstene-17β-Ol-1,2-Dione 17-Propionate*

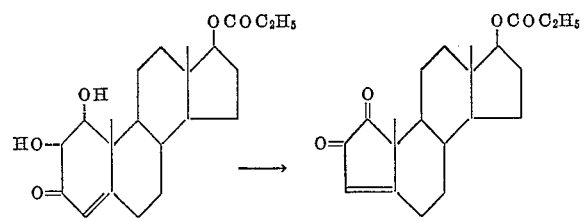

To a solution of 4-androstene-1α,2α,17β-triol-3-one-17-propionate (500 mg.) in chloroform (50 ml.), there is added manganese dioxide (5 g.), and the resultant mixture is stirred for 6 hours at 30° C. Working up in the similar manner to Example 4, the crude product (275 mg.) is recrystallized from methanol to yield A-nor-3(5)-androstene-17β-ol-1,2-dione 17-propionate as scales melting at 160 to 162° C.

U.V.:$\lambda_{max.}^{ethanol}$ 283 mμ (ε:6,200). I.R.:$\lambda_{max.}^{Nujol}$ 5.74, 5.84, 6.25μ.

Analysis.—Calcd. for $C_{21}H_{28}O_4$: C, 73.22; H, 8.19. Found: C, 73.45; H, 8.29.

The starting compound in this example, 4-androstene-1α,2α,17β-triol-3-one 17-propionate, is prepared from 1,4-androstadiene-17β-ol-3-one 17-propionate (1-dehydrotestosterone propionate) as in Example 3, but employing benzenechloroform (1:1) and chloroform as the eluating solvent.

EXAMPLE 6

*Preparation of A-Nor-3(5)-Pregnene-1,2,20-Trione*

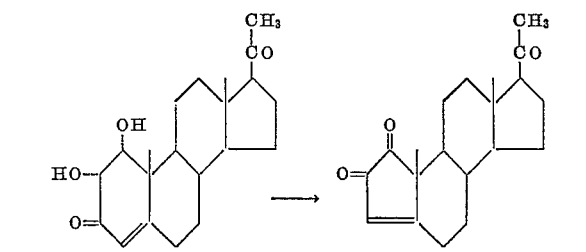

To a solution of 4-pregnene-1α,2α-diol-3,20-dione (300 mg.) in chloroform (30 ml.), there is added manganese dioxide (3 g.), and the resultant mixture is stirred for 6 hours at a room temperature (around 20° C.). Working up in similar manner to Example 4, the crude product (192 mg.) is recrystallized from a mixture of acetone and petroleum ether to yield A-nor-3(5)-pregnene-1,2,20-trione (120 mg.) as scales melting at 180 to 181° C. [α]D +75.3° (c., 1.029 in chloroform).

U.V.:$\lambda_{max.}^{ethanol}$ 283 mμ (ε:6,150). I.R.:$\nu_{max.}^{Nujol}$ 1753, 1714, 1603 cm.$^{-1}$ Analysis.—Calcd. for $C_{20}H_{26}O_3$: C, 76.50; H, 8.34. Found: C, 76.31; H, 8.44.

The starting compound in this example, 4-pregnene-1α,2α-diol-3,20-dione, is prepared from 1,4-pregnadiene-3,20-dione as in Example 3, but employing chloroform as the eluating solvent.

EXAMPLE 7

*Preparation of A-Nor-3(5)-Pregnene-21-Ol-1,2,20-Trione 21-Acetate*

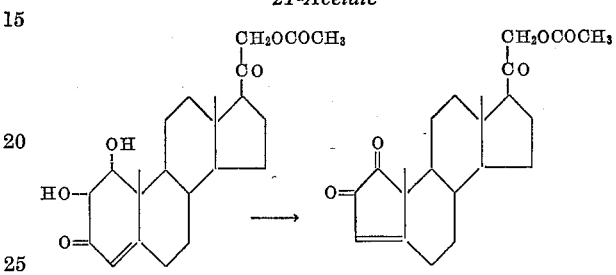

To a solution of 4-pregnene-1α,2α,21-triol-3,20-dione 21-acetate (300 mg.) in chloroform (30 ml.), there is added manganese dioxide (3 g.), and the resultant mixture is stirred for 6 hours at room temperature (around 20° C.). Working up in similar manner to Example 4, the crude product (193 mg.) is recrystallized from a mixture of acetone and petroleum ether to yield A-nor-3(5)-pregnene-21-ol-1,2,20-trione 21-acetate (136 mg.) as yellow prisms melting at 218 to 220° C. [α]D+90.9° (c., 1.050 in chloroform).

U.V.:$\lambda_{max.}^{ethanol}$ 283 mμ (ε:6,200). I.R.:$\nu_{max.}^{Nujol}$ 1753, 1710, 1600 cm.$^{-1}$ Analysis.—Calcd. for $C_{22}H_{28}O_5$: C, 70.94; H, 7.58. Found: C, 71.00; H, 7.67.

The starting compound in this example, 4-pregnene-1α,2α,21-triol-3,20-dione 21-acetate, is prepared from 1,4-pregnadiene-21-ol-3,20-dione 21-acetate (1-dehydrocortexone) as in Example 3, but employing chloroform as the eluating solvent.

EXAMPLE 8

*Preparation of A-Nor-3(5)-Androstene-17β-Ol-1,2-Dione 17-Propionate*

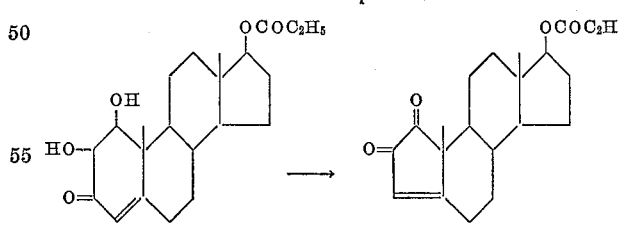

To a solution of 4-androstene-1α,2α,17β-triol-3-one 17-propionate (50 mg.) in an organic solvent (20 ml.), there is added manganese dioxide (500 mg.), and the resultant mixture is stirred for several hours at a temperature between 30 and 33° C. The produced amount of A-nor-3(5)-androstene-17β-ol-1,2-dione 17-propionate during the reaction is measured by ultra-violet absorption spectrum. The yield at the optimum reaction time for each solvent is tabulated as follows:

| Solvent | chloroform | acetone | benzene | carbon tetrachloride | t-butanol |
| --- | --- | --- | --- | --- | --- |
| Reaction Time, hours | 6 | 4 | 4 | 6 | 4 |
| Yield, percent | 60 | 68 | 54 | 40 | 60.6 |

Having thus disclosed the invention, what is claimed is:

1. A process which comprises treating a member selected from the group consisting of androstanes, pregnanes, cholestanes and spirostanes wherein the A ring is substituted as follows:

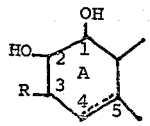

wherein R represents a member selected from the group consisting of hydroxyl and oxo and, when R is a hydroxyl group, the double bond shown by dotted line is indispensable, with manganese dioxide in an inert organic solvent at a tempertaure between 10 and 40° C. to prepare the corresponding A-nor-steroid wherein the A ring is substituted as follows:

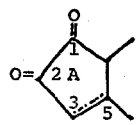

2. A process according to claim 1, wherein the reaction is carried out within about 6 hours.

3. A process according to claim 1, wherein the reaction is carried out in an inert organic solvent selected from the group consisting of chloroform, acetone, benzene, carbon tetrachloride, t-butanol and dioxane.

4. A-nor-3(5)-cholestene-1,2-dione.

5. A - nor-3(5)-pregnene-11β,17α,21-triol-1,2,20-trione 21-acetate.

6. A-nor-3(5)-androstene-17β-ol-1,2-dione 17-propionate.

7. A-nor-3(5)-pregnene-1,2,20-trione.

8. A-nor-3(5)-pregnene-21-ol-1,2,20-trione 21-acetate.

No references cited.